(12) United States Patent
Toncelli

(10) Patent No.: US 8,444,892 B2
(45) Date of Patent: May 21, 2013

(54) METHOD AND PLANT FOR MANUFACTURING ARTICLES IN THE FORM OF SHEETS OR BLOCKS OF CONGLOMERATE STONE OR STONE-LIKE MATERIAL

(76) Inventor: Luca Toncelli, Bassano del Grappa (IT)

( * ) Notice: Subject to any disclaimer, the term of this patent is extended or adjusted under 35 U.S.C. 154(b) by 790 days.

(21) Appl. No.: 11/994,422

(22) PCT Filed: Jun. 28, 2006

(86) PCT No.: PCT/EP2006/063632
§ 371 (c)(1),
(2), (4) Date: Jan. 2, 2008

(87) PCT Pub. No.: WO2007/009860
PCT Pub. Date: Jan. 25, 2007

(65) Prior Publication Data
US 2008/0197520 A1    Aug. 21, 2008

(30) Foreign Application Priority Data

Jul. 18, 2005 (IT) .............................. TV2005A0106

(51) Int. Cl.
*B29B 7/38* (2006.01)

(52) U.S. Cl.
USPC ............... 264/113; 264/39; 264/71; 264/102; 264/140; 264/236; 425/504; 425/130; 425/223; 425/225; 425/230; 425/388; 425/432; 425/324.1; 425/383

(58) Field of Classification Search
USPC ................................ 264/39, 71; 425/202, 206
See application file for complete search history.

(56) References Cited

U.S. PATENT DOCUMENTS

| 2,309,571 | A | * | 1/1943 | Bruce et al. .................... 264/113 |
| 3,929,730 | A |   | 12/1975 | Graefe et al. |
| 4,698,010 | A | * | 10/1987 | Toncelli ........................ 425/200 |

(Continued)

FOREIGN PATENT DOCUMENTS

| DE | 1170850 | 5/1964 |
| EP | 0786325 | 7/1997 |

(Continued)

OTHER PUBLICATIONS

Also enclosed the International Search Report and Written Opinion dated Nov. 30, 2006 from the corresponding PCT/EP2006/063632.

*Primary Examiner* — Christina Johnson
*Assistant Examiner* — Saeed Huda
(74) *Attorney, Agent, or Firm* — Katten Muchin Rosenman LLP

(57) ABSTRACT

In order to manufacture articles in the form of sheets or blocks of conglomerate stone or stone-like material, single mixes are prepared in mixers (18*a,b,c,*) arranged in a line and at intervals along a conveyor belt (12), each mixer depositing on said conveyor belt a layer of single mix which is arranged on top of the mix deposited by the mixer immediately upstream, forming a multiple mix which is then fed in an axially offset position to a rotating support (24) provided with homogenizing means and then passes to the vacuum vibrocompression section, after a deaeration step. A crushing device (32) is inserted between each mixer and the underlying belt so as to control the size of the agglomerations in each mix. Means (34) are envisaged for cleaning the upper surface (12*a*) of the conveyor belt (12) and the crushing devices (32) between the cycles for preparation of the multiple mix.

12 Claims, 3 Drawing Sheets

U.S. PATENT DOCUMENTS

| | | | | |
|---|---|---|---|---|
| 4,921,659 A * | 5/1990 | Marshall et al. | | 264/510 |
| 5,174,823 A | 12/1992 | Toncelli | | |
| 5,649,616 A * | 7/1997 | Stecklow | | 198/496 |
| 5,800,747 A * | 9/1998 | Cavasin | | 264/39 |
| 5,928,585 A * | 7/1999 | Toncelli | | 264/71 |
| 6,319,342 B1 * | 11/2001 | Riddell | | 156/62.4 |
| 6,355,191 B1 * | 3/2002 | Toncelli | | 264/40.4 |
| 6,494,974 B2 * | 12/2002 | Riddell | | 156/62.4 |
| 2001/0023814 A1 * | 9/2001 | Franzoni et al. | | 198/495 |
| 2004/0265413 A1 * | 12/2004 | Russell et al. | | 425/375 |

FOREIGN PATENT DOCUMENTS

| | | | |
|---|---|---|---|
| IT | 1242777 | | 5/1994 |
| WO | 03086634 | | 10/2003 |
| WO | 2004011220 | | 2/2004 |
| WO | WO 2004/011220 | * | 2/2004 |
| WO | 2006045728 | | 5/2006 |
| WO | 2006048350 | | 5/2006 |
| WO | 2006084792 | | 8/2006 |
| WO | 2006122892 | | 11/2006 |

* cited by examiner

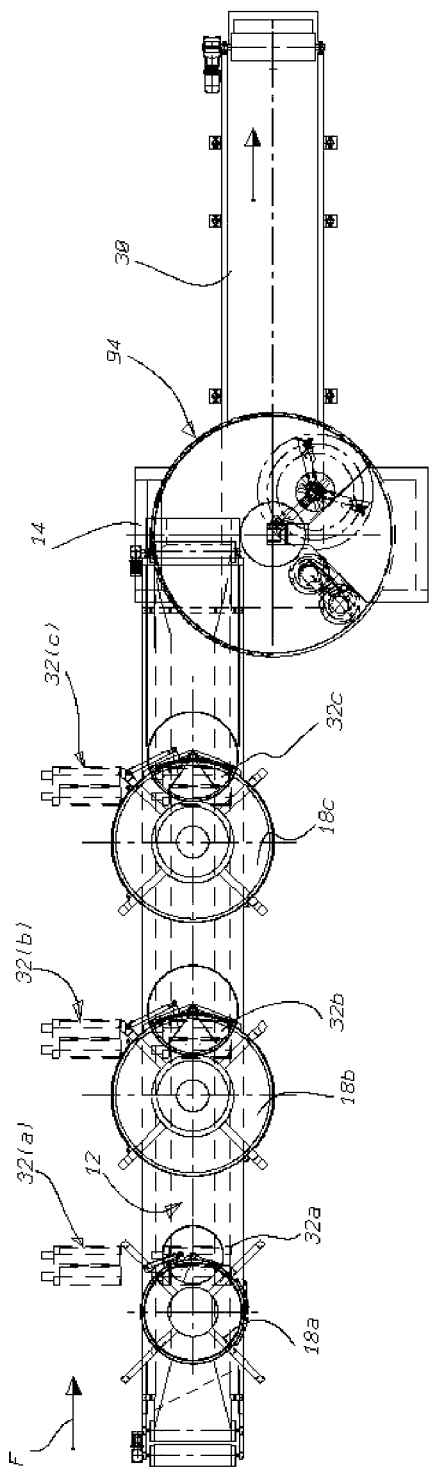

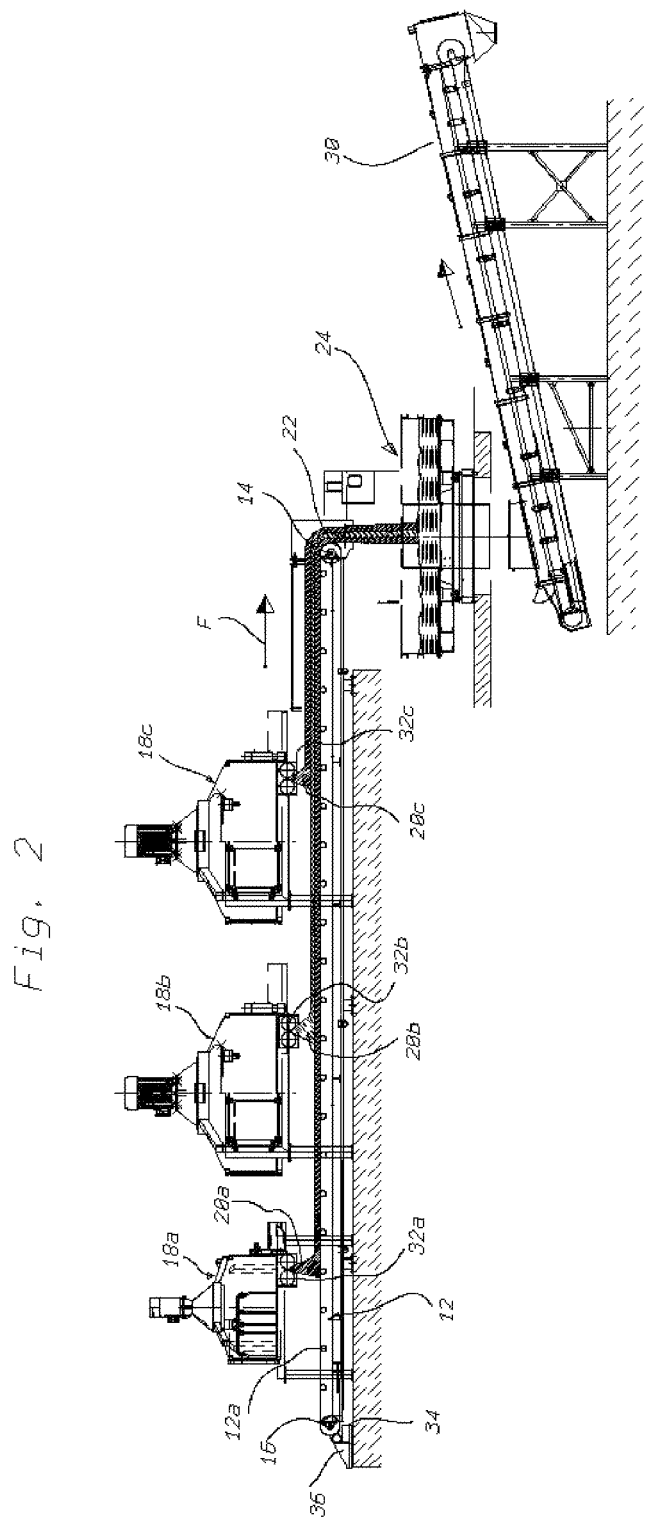

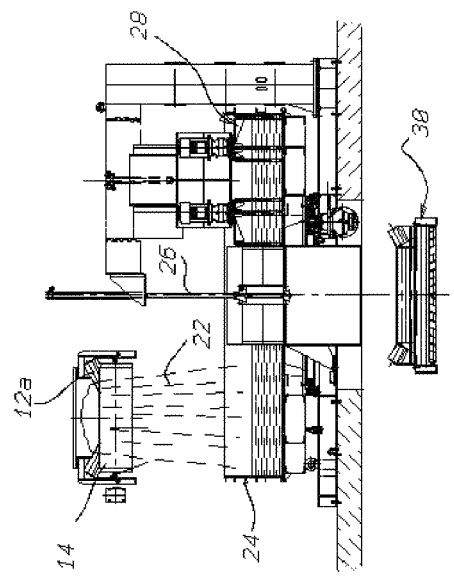

METHOD AND PLANT FOR MANUFACTURING ARTICLES IN THE FORM OF SHEETS OR BLOCKS OF CONGLOMERATE STONE OR STONE-LIKE MATERIAL

The present invention relates to the manufacture of articles of conglomerate stone or stone-like material, in particular articles in the form of large-size sheets or blocks.

In relatively recent years technology for manufacturing articles in the form of sheets or blocks, consisting of a stone or stone-like conglomerate material, has been developed and has become established industrially, these articles being characterized by various advantageous properties, including the possibility of producing large blocks (size of about 3.1×1.4×0.9 meters) to be sawn into sheets or directly sheets with large dimensions (of about 3.2×1.6 meters) and a relatively small thickness (a few centimetres), such that they are suitable for forming internal and external flooring and cladding of buildings as well as furnishing components.

Secondly these articles have a notable uniformity in terms of external appearance, in particular of the surface which is intended to remain visible, these properties being difficult to obtain in the case of sheets obtained by means of sawing from blocks of natural stone (such as marble, granite, porphyry, etc.).

Thirdly these conglomerate articles may be made from surplus crushed stone material, namely material which would otherwise remain unused after the operations involving extraction of blocks of stone material from the quarries, with an obvious advantage not only from the point of view of the costs of the raw materials but also as regards environmental impact.

The technology in question envisages essentially:

(a) preparation of an initial mix consisting mainly of one or more stone or stone-like granular materials, said granular materials having a selected particle size, and a binder;

(b) deposition of a layer of predefined thickness of this mix on a temporary support surface, together with subsequent covering of the mix with a similar support, or in a mould;

(c) a vacuum vibrocompression step, during which the layer of mix undergoes the action of a press in an environment in which a predefined vacuum has been formed and at the same time a vibratory movement of predefined frequency is applied to the layer;

(d) a final step involving hardening of the resultant rough-formed article, the procedures for this step depending mainly on the nature of the binder.

In the technology in question it is possible to use an inorganic binder, in particular of the cement-based type, in which case the hardening step is performed using the procedures which are typical of cement-based articles.

Alternatively, it is possible to use a binder consisting of an organic hardening resin, in which case hardening of the rough-formed sheet is performed using techniques which are well-known for synthetic resins, usually by means of the combined action of a catalyst and an accelerator with possible application of heat.

For more detailed information regarding these processes and plants for producing both types of sheet-like articles reference should be made to the following documents: European patent No. 786,325 and 1,027,205 relating to the use of organic binders and Italian patent application No. TV2004000103 relating to inorganic binders.

Italian patent No. 1,181,570 describes a method and a plant of this kind and envisages that the initial mixing step is also performed under a vacuum.

Italian patent No. 1,242,777 in turn describes a method and an apparatus for preparing mixes of stone or ceramic material, involving in particular the combination of at least two base mixes which are different from each other owing to the nature of the aggregate contained in the mix and/or the colouring thereof before they are fed to the abovementioned support or to the formwork for the vacuum vibrocompression step.

Specifically the two or more mixes are deposited in the form of layers in points of an annular rotating container situated at a distance from each other. The speed imparted to the annular container is such that the mixes, as they fall onto the ring, form layers which are arranged on top of each other.

Preferably rotating vanes or fixed blades are used for a homogenizing action and optimum composition of the layers deposited in succession, following which the resultant final mix is transferred to the vibrocompression step.

All this technology is aimed in particular at the production of articles in the form of sheets which resemble as far as possible natural stone material, said material, in the case of granite, having varying colours and in particular a characteristic aggregated crystal appearance. In fact, when observing a sheet of granite, especially a finished and hence smoothed and polished sheet, it can be noted how it very often has three or often more components with a different colour and size.

With the development of the possible applications it has been necessary to use various mixes, namely which are more than three in number, but which must be combined with each other so as to have the same intermixing characteristics mentioned above.

Essentially this means that each mix must form strips or veins which alternate with strips or veins of the other mixes, without there being any mixing of the mixes except along a small section in the zone of mutual contact.

In this situation it is very difficult to adopt the configuration indicated in the already mentioned Italian patent No. 1,242,777, owing to the difficulty or even the physical impossibility of arranging the individual mixers in a position suitable for supplying their own mix to the rotating annular support.

The main object of the present invention is to solve this specific problem in an industrially advantageous manner, facilitating and automating also the operations of cleaning the mix transportation and conveying systems.

This object is achieved with a method and a plant for manufacturing articles in the form of sheets using the method previously mentioned by means of a multiple mix consisting of a plurality of single mixes arranged on top of each other.

More specifically, the method according to the present invention envisages the steps of depositing in succession on a conveying surface a layer of each mix, in such a way that each layer is arranged above the immediately preceding layer, forming a multiple-layer or multiple-mix structure, and feeding the multiple mix to a container or support, preferably with an annular configuration, rotating at a controlled speed of the type described in the already mentioned Italian patent No. 1,242,777, the final mix which is discharged from said rotating container being then transferred for a deaeration step before proceeding with the already mentioned vacuum vibrocompression and hardening steps.

In turn the plant according to the present invention envisages a frame supporting a conveyor belt, the upper surface of which is positioned in succession underneath the discharge opening of each mixer of a plurality of mixers, inside each of which a single monochromatic mix is prepared, so that the layer of mix which is gradually discharged from each mixer is arranged above the layer of mix deposited by the immediately preceding mixer, forming a layered or multiple-mix structure, a rotating container or support, preferably with an annular configuration, inside which said multiple mix is discharged in an axially offset position with respect to the axis of rotation of the said support so as to produce an accumulation with an annular shape, said multiple mix being subject to the action of homogenizing means integral with said support, the mix emerging from said rotating support, normally by means of the action of rotating vanes or blades, being fed optionally to a deaeration section, before proceeding to the vacuum vibro-compression and hardening sections.

In the preferred embodiment of the present invention a crushing or lump-breaking device is positioned between the discharge outlet of each mixer and the conveyor belt for forming the multiple mix, in such a way as to reduce any lumps of mix which form in the mixer to a controlled size.

These crushing devices consist normally of pairs of counter-rotating cylinders with a continuous surface or cylindrical cages having an adjustable speed and interaxial distance, such as those described, for example, in U.S. Pat. No. 5,174,823 and in the international applications No. WO 03 086634 and Italian application No. TV2004A000118.

In this way it is not only possible to ensure that the various mixes deposited on the belt have agglomerations with a controlled size, but it is also possible to vary their dimensions from mixer to mixer and therefore from one individual mix to another.

It is thus possible to achieve particular aesthetic effects and in particular it is possible to reproduce with very great accuracy stone materials such as granites in which the differently coloured crystal formations normally also have different dimensions.

The crushing devices are preferably mounted so as to be extractable from the position underneath the associated mixer, so that, during the period of time assigned for the preparation of the individual mixes (normally about 10 minutes), it is possible to perform manual cleaning thereof or fit the cylinders with a scraper blade which separates any residual mix, causing it to fall on the conveyor belt from where it is then discharged into a receiving tray or container by means of reverse rotation of the said belt during the period assigned for preparation of the individual mixes.

The conveyor belt on which the multiple mix is formed may be equipped, preferably at the opposite end to that for discharging the multiple mix into the rotating support, with a cleaning brush preferably associated with a supply of suitable solvent, such as, for example, a tray inside which the bristles of the brush are immersed.

In this case also the cleaning operation is performed taking advantage of the step for preparation of the single mixes, during which the conveyor belt is displaced slowly in contact with the brush moistened with the solvent.

In this way it is ensured that the conveyor belt, at the start of each multiple-mix preparation cycle, is free of incrustations which could otherwise result in contamination of the multiple mix to be prepared. At the same time it is easier to modify the production so as to obtain multiple mixes with a different colour and therefore sheet-like articles with different aesthetic properties.

The particular features and advantages of the present invention will emerge more clearly from the detailed description which follows of a preferred embodiment, provided by way of a non-limiting example, with reference to the accompanying drawings in which:

FIG. 1 is a plan view, from above, of the plant section for preparing said multiple mix;

FIG. 2 is a schematic side view of the section shown in FIG. 1; and

FIG. 3 is a detailed view of the rotating container of the annular type.

With reference first of all to FIGS. 1 and 2, this shows the plant section for preparation of the multiple mix, comprising at least two and preferably more than two single monochromatic mixes.

The main frame of the plant indicated generally by the reference number 10 supports an endlessly wound conveyor belt 12 equipped in a conventional manner with a motor-driven actuating roller 14 and a transmission roller 16 so that the upper section 12a of the conveyor belt moves at a controlled speed in the direction indicated by the arrow F in FIGS. 1 and 2.

Mixers 18(a,b,c) of the type with horizontal or inclined axes or preferably with vertical axes, such as for example the mixer described and illustrated in Italian patent application No. TV2005A000020, are mounted at predetermined intervals along the longitudinal axis of the belt 12. From FIG. 2 it can be readily understood that a first mix 20a is discharged from the first mixer 18a and is deposited on the surface of the upper section 12a of the conveyor belt 12, forming a layer of predetermined thickness (normally a few centimetres).

The displacement of the conveyor belt brings the surface portion already covered by the mix 20a opposite the discharge mouth of the second mixer 18b inside which a second monochromatic mix 20b is prepared and is also discharged in the form of a layer on top of the previous mix. The layer 20c, supplied from the mixer 18c, is then deposited on top of the layer 20b. In order to achieve the result indicated above, obviously the discharge doors of the mixers open gradually by an amount and in accordance with a well-defined procedure, depending on the speed of the belt, so that a multi-layer composition is always formed on the belt, from the front end to the tail end of the mix discharged onto its surface.

A uniformly layered multiple mix 22 reaches the downstream end of the conveyor belt 12 (where the motor-driven roller 14 is situated) and is fed by means of gravity into the rotating support 24.

As already mentioned, in the preferred embodiment of the present invention, the single mix discharged from each mixer 18 is made to pass through a crusher or lump-breaking device 32(a,b,c), comprising two opposite and counter-rotating cylinders with a continuous surface, between which a through-slit for the mix is adjustably defined, said slit corresponding to a predefined size of the agglomerations present in each mix.

As already mentioned, it is possible to use the lump-breaking device described and claimed in Italian patent application No. TV2002A000044, equipped with means for adjusting the speed of rotation and the distance of the rollers and therefore the abovementioned size, or the device described in Italian patent application No. TV2004A000118.

It is also obvious that in this way it is possible to adjust the size of the agglomerations or lumps in each single mix independently of that in other mixes, resulting in greater flexibility during processing and therefore as regards the aesthetic characteristics of the final product.

The single mix which is deposited on the conveyor belt 12 is therefore that discharged from each device 32.

Preferably, each device 32, if it is of the type consisting of cylinders with a continuous surface, has, associated with it, a scraper blade acting on each roller so that, during preparation of the individual mixes, during which both the conveyor belt 12 and the devices 32 are not active, it is possible to perform cleaning of the surfaces of the rollers, causing them to rotate so that the scraper blade separates the residual mix still attached to the surface of the rollers.

This residual matter falls onto the surface of the conveyor belt 12 which, for example, may be actuated in the opposite direction to that of the arrow F so that it conveys the aforementioned residual matter upstream until it falls into a receiving tank or tray.

At the same upstream end of the conveyor belt 12, namely that corresponding to the transmission roller 16, there is preferably associated a cleaning device comprising a brush 34, the bristles of which are immersed in a tank 36 containing a solvent useful for facilitating separation, from the surface of the belt 12, of residual mix and incrustations which during the previous cycle have formed on the upper surface of the belt 12.

In this way perfect cleaning of the belt 12 between one production cycle and another is ensured, at the same time making it possible not only to avoid contamination of the articles produced during the following cycle, but also to change, rapidly and without the need for manual cleaning operations, the type of product, namely switch to other types and combinations of individual mixes which are different in terms of colour characteristics and/or size of the agglomerations.

As shown in FIG. 3, the multiple mix 22 is fed into the rotating support 24 in a position axially offset with respect to the axis of rotation 26, resulting in an annular arrangement and also being subject to the homogenizing action of the vanes or blades 28, as explained in greater detail in the already mentioned Italian patent No. 1,242,777.

From the rotating container 24 the resultant mix, which is ready for deposition in the form of a layer of predefined thickness on a temporary support or in a mould for the vacuum vibrocompaction step, is discharged onto the conveyor belt 30 and, optionally, is made to pass through a deaeration section, which may be of the type described in Italian patent application No. TV2005A000068.

It is worth noting that the deaeration section is used only for the articles in the form of blocks; in the case of sheets the deaeration step is performed directly inside the forming chamber before the vacuum vibrocompression step, in view of the reduced thickness of the layer of mix. Using the method and the plant according to the present invention it is possible to manufacture industrially sheets or blocks with aesthetic and/or chromatic effects not possible hitherto, obtaining the inter-positioning of varied mixes without mixing thereof (so that they retain their identity—in particular their chromatic identity).

Moreover, with the method and the plant according to the invention it is possible to achieve the industrial production of sheets or blocks, the aesthetic appearance of which does not change from one production cycle to another, since it is sufficient to define the composition and the procedures for preparing the individual mixes as well as the operating conditions of plant, such as the speed of displacement of the conveyor belt 12, the discharge rate of each mixer 18, the aperture or speed of the crushing devices and the speed of rotation of the rotating support 24, in order to ensure the uniformity of the end product.

It is understood that conceptually and mechanically equivalent modifications and variations are possible in respect of that described above and may be envisaged within the scope of the following claims.

In particular, the structure of the plant allows a large number of mixers 18 to be associated with the conveyor belt 12, each mixer being assigned to a particular single mix, so that, if it is required to obtain the programmed production of sheets or blocks with different aesthetic features, it is sufficient to predefine for each multiple-mix composition 22 (corresponding to each type of sheet) the mixers to be used and the operating conditions already mentioned.

Likewise, in the above description, reference has been made to a deaeration step following preparation of the multiple mix, but it is also possible to envisage that the plant section for preparation of the multiple mix is itself kept under a vacuum sufficient to ensure, at the same time as the deposition of the single layers on the conveyor belt, removal of any air incorporated in the mixes during mixing.

The invention claimed is:

1. A method for manufacturing articles in the form of sheets or blocks, the method comprising:
   (a) preparing a plurality of starter mixes, each starter mix consisting of one or more granular materials having a selected particle size and a binder, each starter mix being monochromatic;
   (b) depositing according to a program in succession a first layer of each of the plurality of starter mixes onto a single common conveyor belt to form a multiple layer structure, each first layer having a predetermined thickness, the first starter mix being deposited directly on the conveyor belt, the subsequent starter mixes being selectively deposited onto the immediately preceding starter mix that was deposited;
   (c) discharging the multiple layer structure onto a rotating support or into a container to form a final mix having an annular shape, the rotating support or container being disposed in an axially offset position relative to the conveyor belt;
   (d) discharging the final mix having the annular shape onto a temporary support;
   (e) covering the multiple layer structure with a cover;
   (f) vacuum vibro-compressing the multiple layer structure to form a rough-formed article; and
   (g) hardening the rough-formed article to form a finished shape.

2. Method according to claim 1, wherein the final mix is transferred to undergo a deaeration step before undergoing the vacuum vibrocompression and hardening steps.

3. Method according to claim 1, wherein each starter mix prior to being deposited is passed through lump breaking devices for a crushing or lump breaking operation to regulate the granular material in each starter mix, wherein the lump breaking devices are positioned at a respective discharge outlet of each mixer for the respective initial mixes.

4. Method according to claim 1, further comprising the step (h) of repeating steps (a) through (f) in a subsequent cycle and wherein the conveyor belt is cleaned after step (d) and before step (b) in the subsequent cycle.

5. Method according to claim 4, wherein the cleaning is performed by brushing an upper surface of the conveyor belt with a solvent.

6. Method according to claim 3, wherein the lump breaking operation is performed in lump-breaking devices, the lump breaking devices are cleaned after step (b) and in a subsequent cycle before step (b).

7. Method according to claim 3, wherein the lump breaking devices are being cleaned between step (a) and wherein the conveyor belt is cleaned during step (a).

8. A plant operating a method for manufacturing articles in the form of sheets or blocks, the method comprising:
   (a) preparing a plurality of starter mixes, each starter mix consisting of one or more granular materials having a selected particle size and a binder, each starter mix being monochromatic;
   (b) depositing according to a program in succession a first layer of each of the plurality of starter mixes onto a single common conveyor belt to form a multiple layer structure, each first layer having a predetermined thickness, the first starter mix being deposited directly on the conveyor belt, the subsequent starter mixes being selectively deposited onto the immediately preceding starter mix that was deposited;
(c) discharging the multiple layer structure onto a rotating support or into a container to form a final mix having an annular shape, the rotating support or container being disposed in an axially offset position relative to the conveyor belt;
(d) discharging the final mix having the annular shape onto a temporary support;
(e) covering the multiple layer structure with a cover;
(f) vacuum vibro-compressing the multiple layer structure to form a rough-formed article; and
(g) hardening the rough-formed article to form a finished shape.

9. A method of operating a plant for manufacturing articles in the form of sheets or blocks, the method comprising:
(a) preparing a plurality of starter mixes, each starter mix consisting of one or more granular materials having a selected particle size and a binder, each starter mix being monochromatic;
(b) depositing according to a program in succession a first layer of each of the plurality of starter mixes onto a single common conveyor belt to form a multiple layer structure, each first layer having a predetermined thickness, the first starter mix being deposited directly on the conveyor belt, the subsequent starter mixes being selectively deposited onto the immediately preceding starter mix that was deposited;
(c) discharging the multiple layer structure onto a rotating support or into a container to form a final mix having an annular shape, the rotating support or container being disposed in an axially offset position relative to the conveyor belt;
(d) discharging the final mix having the annular shape onto a temporary support;
(e) covering the multiple layer structure with a cover;
(f) vacuum vibro-compressing the multiple layer structure to form a rough-formed article; and
(g) hardening the rough-formed article to form a finished shape.

10. The method of claim 1, further comprising after step (c) the step of subjecting the final mix to a homogenizing action.

11. The method of claim 8, further comprising after step (c) the step of subjecting the final mix to a homogenizing action.

12. The method of claim 9, further comprising after step (c) the step of subjecting the final mix to a homogenizing action.

\* \* \* \* \*